US011747602B2

(12) United States Patent
Lee et al.

(10) Patent No.: US 11,747,602 B2
(45) Date of Patent: Sep. 5, 2023

(54) HOLOGRAPHIC DISPLAY APPARATUS

(71) Applicant: Samsung Display Co., Ltd., Yongin-si (KR)

(72) Inventors: Jiwon Lee, Yongin-si (KR); Youngchan Kim, Yongin-si (KR); Byungchoon Yang, Yongin-si (KR); Jaeho You, Yongin-si (KR); Cheonmyeong Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 107 days.

(21) Appl. No.: 16/997,400

(22) Filed: Aug. 19, 2020

(65) Prior Publication Data

US 2021/0223524 A1  Jul. 22, 2021

(30) Foreign Application Priority Data

Jan. 21, 2020 (KR) .................... 10-2020-0007966

(51) Int. Cl.
*G02B 19/00* (2006.01)
*F21V 8/00* (2006.01)
*G03H 1/22* (2006.01)

(52) U.S. Cl.
CPC ......... *G02B 19/0061* (2013.01); *G02B 6/003* (2013.01); *G02B 6/005* (2013.01); *G02B 19/0009* (2013.01); *G03H 1/2286* (2013.01); *G03H 1/2294* (2013.01); *G03H 2001/2234* (2013.01); *G03H 2222/12* (2013.01);
(Continued)

(58) Field of Classification Search
CPC ............ G02F 1/133607; G02F 66/003; G02F 66/005; G02F 619/0061; G02B 6/003; G02B 6/005; G02B 19/0061; G03H 1/2294; G03H 1/02; G03H 1/2286; G03H 2001/2234; G03H 2222/12; G03H 2222/35; G03H 2222/53; G03H 2223/12; G03H 2223/16; G03H 2223/17; G03H 2225/22; G03H 2250/38; F21V 13/02; F21V 17/104; F21V 17/14
See application file for complete search history.

(56) References Cited

U.S. PATENT DOCUMENTS 8,179,362 B2 * 5/2012 Brigham .............. H04N 13/398
362/612
8,416,479 B2  4/2013 Kroll et al.
(Continued)

FOREIGN PATENT DOCUMENTS

CN  WO 2019029086  *  2/2019  ....... G02F 1/133617
JP  WO 2013051437  *  4/2013  ....... G02F 1/133611
(Continued)

OTHER PUBLICATIONS

English Machine Translation of WO 2013051437 provided by Espacenet (Year: 2013).*

*Primary Examiner* — Zheng Song
(74) *Attorney, Agent, or Firm* — KILE PARK REED & HOUTTEMAN PLLC

(57) ABSTRACT

A holographic display apparatus includes a light source disposed on a printed circuit board, a display panel diffracting light transferred from the light source, and an optical system disposed between the light source and the display panel. The optical system converts the light incident from the light source into a surface light source.

20 Claims, 13 Drawing Sheets

(52) U.S. Cl.
CPC ..... *G03H 2223/16* (2013.01); *G03H 2225/22* (2013.01); *G03H 2250/38* (2013.01)

(56) References Cited

U.S. PATENT DOCUMENTS

| | | | |
|---|---|---|---|
| 10,649,275 B1* | 5/2020 | Johnson | G02F 1/1323 |
| 2008/0043466 A1* | 2/2008 | Chakmakjian | F21V 5/04 |
| | | | 362/237 |
| 2012/0019883 A1 | 1/2012 | Chae et al. | |
| 2012/0176423 A1* | 7/2012 | Nagato | G02F 1/133526 |
| | | | 362/231 |
| 2016/0010811 A1* | 1/2016 | Benitez | F21V 11/186 |
| | | | 362/147 |
| 2018/0347786 A1* | 12/2018 | Feng | F21V 5/007 |
| 2019/0086598 A1 | 3/2019 | Futterer | |
| 2019/0238826 A1 | 8/2019 | Sissom et al. | |
| 2020/0263854 A1* | 8/2020 | Booij | F21V 7/04 |

FOREIGN PATENT DOCUMENTS

| | | |
|---|---|---|
| KR | 10-1411697 | 6/2014 |
| KR | 10-1704738 | 2/2017 |

* cited by examiner

HOLOGRAPHIC DISPLAY APPARATUS

CROSS-REFERENCE TO RELATED APPLICATION

This application claims priority to and benefit of Korean Patent Application No. 10-2020-0007966 under 35 U.S.C. § 119, filed on Jan. 21, 2020, in the Korean Intellectual Property Office, the entire contents of which are incorporated herein in by reference.

BACKGROUND

1. Technical Field

One or more embodiments relate to a display device, and to a display device having a holographic display apparatus.

2. Description of the Related Art

There has been a demand in display technologies of a display apparatus capable of realizing 3D (three-dimensional) images to display more realistic images. Accordingly, there have been researches and developments of display apparatuses capable of displaying 3D images.

Technologies have been developed for displaying 3D images on apparatuses having 2D image display capability. Such technologies may include a stereoscopic image display using special glasses, a glass-less stereoscopic display, and a holographic display.

Among the 3D image display technologies, a holographic display technology is gaining more interest. In reproducing a hologram image, a technique capable of clearly implementing a diffraction pattern through a display panel has been desired, and researches have been conducted with respect to such techniques.

It is understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

One or more embodiments provide a holographic display apparatus having improved clarity of a diffraction pattern. However, the above technical features are exemplary, and the scope of the disclosure is not limited thereto.

Additional aspects will be set forth in part in the description which follows and, in part, will be apparent from the description, or may be learned by practice of the presented embodiments of the disclosure.

According to one or more embodiments, a holographic display apparatus may include a light source disposed on a printed circuit board, a display panel diffracting light transferred from the light source, and an optical system disposed between the light source and the display panel, wherein the optical system may convert the light incident from the light source into a surface light source.

The printed circuit board may include at least one surface of black color.

The holographic display apparatus may further include a condensing lens disposed between the light source and the optical system, and collecting the light transferred from the light source.

The condensing lens may include a first surface adjacent to the printed circuit board, and a second surface farther distant than the first surface from the printed circuit board. The first surface may have an area less than an area of the second surface.

The condensing lens may include a lower portion having a groove, and the light source may be disposed in the groove.

The holographic display apparatus may further include a first mask disposed between the light source and the condensing lens.

The condensing lens may include a lower portion having a guide protrusion, the first mask may include a surface having a guide recess, and the condensing lens and the first mask may be aligned by inserting the guide protrusion into the guide recess.

The first mask may include a lower portion having a groove, and the light source may be disposed in the groove.

The first mask may include an opening through which the light from the light source passes.

The holographic display apparatus may further include a second mask disposed between the condensing lens and the optical system, wherein the second mask may include at least one surface of black color.

The second mask may include an opening, and a size of the opening varies in accordance with a location of the second mask.

The condensing lens may have a dome shape.

According to one or more embodiments, a holographic display apparatus may include a light source disposed on a printed circuit board, a first lens transmitting light emitted from the light source in a direction substantially parallel with a direction from the light source to the first lens, a first mask disposed between the light source and the first lens, the first mask including at least one surface of black color, a waveguide converting light transferred from the first lens into a surface light source, a second lens collecting light transferred from the waveguide, and a display panel diffracting light passing through the second lens, wherein the light passing through the second lens may transmit through a surface of the display panel, and an image is displayed on another surface of the display panel. The surface and the another surface of the display panel may be opposite each other.

The holographic display apparatus may further include a condensing lens disposed between the first mask and the light source.

The condensing lens may include a lower portion having a groove, the light source may be disposed in the groove, and the light emitted from the light source may be refracted through the groove.

The holographic display apparatus may further include a condensing lens disposed between the first lens and the first mask.

The holographic display apparatus may further include a second mask disposed between the condensing lens and the light source. The second mask may include at least one surface of black color.

The light source may include a light-emitting diode.

The display panel may include a liquid crystal display panel.

The first lens may have a convex surface facing the condensing lens or a convex surface facing the waveguide.

Other aspects, features and advantages of the disclosure will become better understood through the accompanying drawings, the claims and the detailed description.

BRIEF DESCRIPTION OF THE DRAWINGS

The above and other aspects, features, and advantages of embodiments of the disclosure will be more apparent from the following description taken in conjunction with the accompanying drawings, in which:

FIG. 1 is a schematic perspective view of a holographic display apparatus according to an embodiment.

DETAILED DESCRIPTION OF THE EMBODIMENTS

Figure 1:
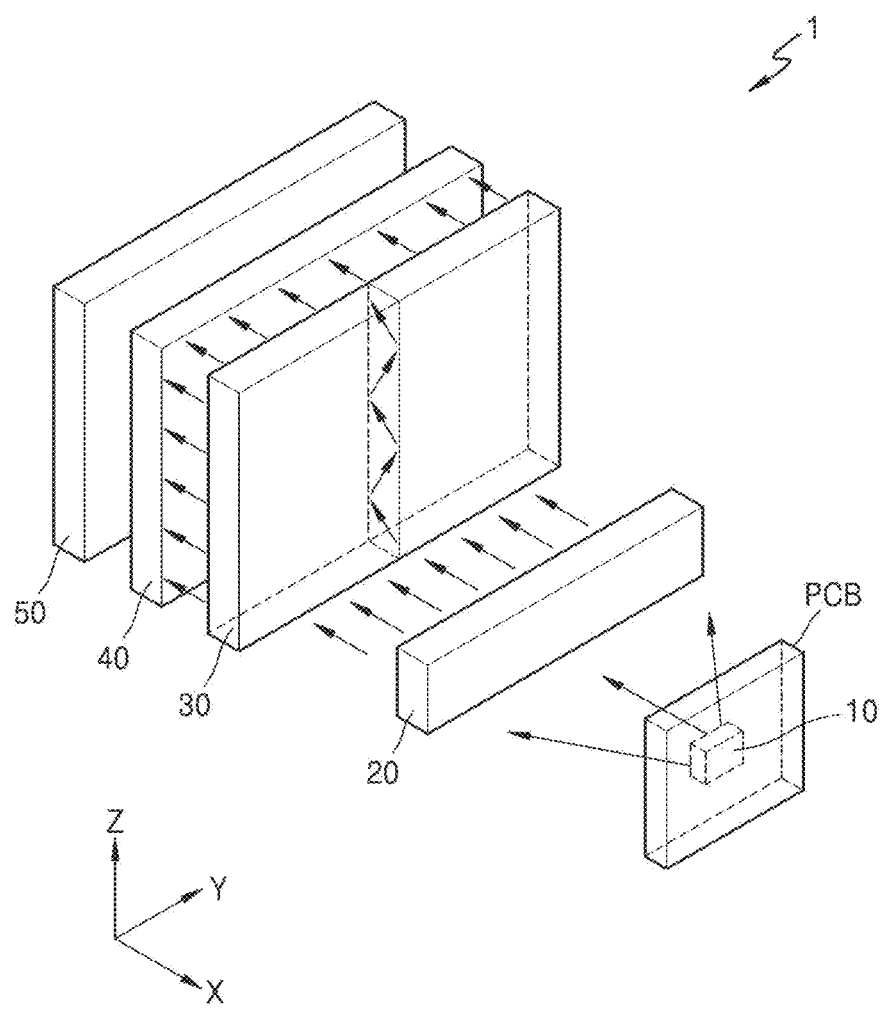

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description. As used herein, the term "and/or" includes all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein.

The example embodiments will be described below in more detail with reference to the accompanying drawings. Those components that are the same or are in correspondence are rendered the same reference numeral regardless of the figure number, and redundant explanations are omitted.

While such terms as "first," "second," etc., may be used to describe various components, such components are not be limited to the above terms. The above terms are used only to distinguish one component from another.

An expression used in the singular encompasses the expression of the plural, unless it has a clearly different meaning in the context.

In the specification, it is to be understood that the terms "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Sizes of components in the drawings may be exaggerated for convenience of explanation. In other words, since sizes and thicknesses of components in the drawings are arbitrarily illustrated for convenience of explanation, the following embodiments are not limited thereto.

In case that a certain embodiment may be implemented differently, a specific process order may be performed differently from the described order. For example, two consecutively described processes may be performed substantially at the same time or performed in an order opposite to the described order.

In the specification, the phrase "A and/or B" denotes A, B, or A and B. In addition, the phrase "at least one of A and B" be construed as A only, B only, C only, or any combination of two or more of A, B, and C.

In the embodiments below, when layers, areas, or elements or the like are referred to as being "connected," it will be understood that they may be directly connected or an intervening portion may be present between layers, areas or elements. For example, when layers, areas, or elements or the like are referred to as being "electrically connected," they may be directly electrically connected, or layers, areas or elements may be indirectly electrically connected and an intervening portion may be present.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Hereinafter, one or more embodiments of the disclosure will be described in detail with reference to accompanying drawings.

Figure 2:
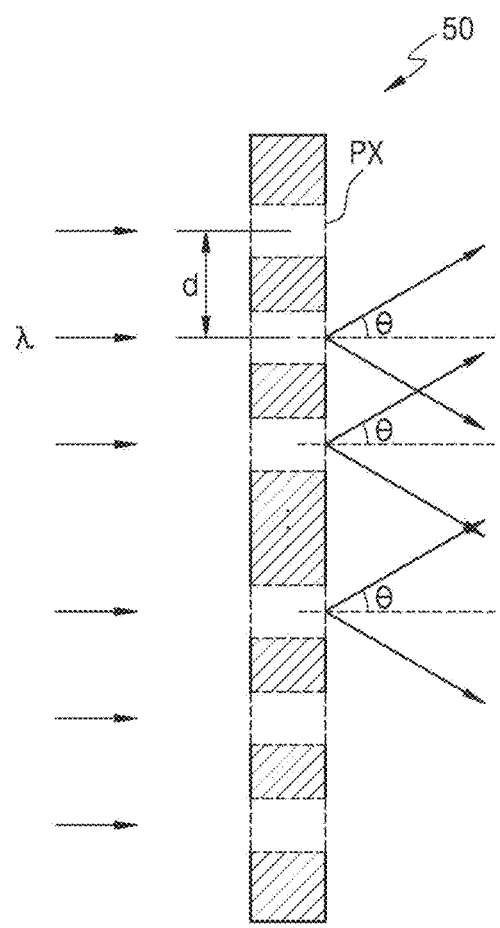
FIG. 2 is a schematic cross-sectional view of a display panel according to an embodiment.

FIG. 1 is a schematic perspective view of a holographic display apparatus 1 according to an embodiment, and FIG. 2 is a schematic cross-sectional view of a display panel 50 according to an embodiment.

Referring to FIG. 1, the holographic display apparatus 1 may include a light source 10, a printed circuit board PCB, an optical system, and the display panel 50. The light source 10 may disposed or mounted on the printed circuit board PCB. The optical system may include a first lens 20, a waveguide 30, and a second lens 40. Light from the light source 10 may sequentially pass through the first lens 20, the waveguide 30, the second lens 40, and the display panel 50.

The light source 10 may include a coherent light source that emits coherent light including multiple wavelength bands. In order to provide light having high coherence, the light source 10 may include, for example, a laser diode (LD).

However, because the light may be diffracted and modulated by the display panel 50 provided that the light has a spatial coherence to a certain degree, a light-emitting diode (LED) may be used as the light source 10. However, the examples of the light source 10 are not limited to an LED. Any type of light source other than the LED may be used, provided that the light having spatial coherence is emitted.

The printed circuit board PCB is a thin plate on which electrical components such as an integrated circuit, a resistor, a switch, etc. are mounted, and the light source 10 may be mounted on the printed circuit board PCB and the light source 10 may be driven by a driver (not shown) mounted on the printed circuit board PCB.

In an embodiment, a surface of the printed circuit board PCB, on which the light source 10 is provided, may be black. In order to make the surface of the printed circuit board PCB black, the surface may be coated with $CrO_x$, $CrO_x/CrN_y$, resin (Carbon pigment, RGB-mixed pigment), graphite, non-Cr based pigment, etc.

In a comparative example, the surface of the printed circuit board may be white. In this case, the light emitted from the light source may be partially reflected by the white surface of the printed circuit board. The reflected light may have a changed phase, and there may be a difference between paths of the reflected light and the light that has not been reflected. Formation of an unpredictable image may be caused due to the procedure of light having different phases. Also, when image patterns are realized through the holographic display apparatus, the patterns may be looked blurred.

However, in case that the surface of the printed circuit board PCB is black as in the embodiment, the light emitted from the light source 10 may not be partially reflected but absorbed by the black surface of the printed circuit board PCB, and thus, the light emitted from the light source 10 may have the same light path, and a predicted result may be obtained when the image is formed.

The printed circuit board PCB may include a metal material such as aluminum (Al), platinum (Pt), palladium (Pd), argentum (Ag), magnesium (Mg), *aurum* (Au), nickel (Ni), neodymium (Nd), iridium (Ir), chromium (Cr), lithium (Li), calcium (Ca), molybdenum (Mo), titanium (Ti), tungsten (W), copper (Cu), etc. In case that the printed circuit board PCB includes aluminum (Al), heat generated by the light source 10 may be sufficiently dissipated to outside via aluminum (Al).

Also, a heat dissipation plate may be attached to the printed circuit board PCB in order to dissipate the heat from the light source 10 to outside.

The first lens 20 may transmit the light emitted from the light source 10 in a direction substantially parallel with a direction from the light source to the first lens 20. The first lens 20 may include engineering plastic such as polymethyl methacrylate (PMMA) or polycarbonate (PC), or a combination thereof. For example, the first lens 20 may include a collimation lens (CL).

In an embodiment, the first lens 20 may have a convex surface facing the light source 10 or a convex surface facing the waveguide 30.

The waveguide 30 may convert the light transferred from the first lens 20 into a surface light source. For example, the light emitted from the light source 10 may proceed as a point light source, and then, may be converted into a line light source and into a surface light source while sequentially passing through the first lens 20 and the waveguide 30.

The second lens 40 may collect the light transferred from the waveguide 30. The second lens 40 may include engineering plastic such as polymethyl methacrylate (PMMA) or polycarbonate (PC). For example, the second lens 40 may include a field lens (FL).

The display panel 50 may include pixels PX, and a display driver (not shown) for driving pixels PX. Detailed functions and structures of the display panel 50 will be described below with reference to FIG. 2.

Referring to FIG. 2, the display panel 50 may include pixels PX each modulating at least one of an amplitude and a phase of the light emitted from the light source 10. The light emitted from the light source 10 may be diffracted while passing through the display panel 50. For example, the display panel 50 may act as a spatial light modulator (SLM), and the display panel 50 may include a liquid crystal (LC) display panel.

For example, each of the pixels PX may include a pixel electrode, an opposite electrode, and a liquid crystal layer between the pixel electrode and the opposite electrode. Orientation of the liquid crystal included in the liquid crystal layer may be changed by an electric field formed by the pixel electrode and the opposite electrode, and at least one of the amplitude and the phase of the light passing through the liquid crystal layer may be modulated in response to the orientation of the liquid crystal. Each of the pixels PX may include a color filter that determines a color of the light passing through the liquid crystal layer. To this end, the display panel 50 may include a color filter layer including color filters.

IA viewing angle is related to a diffraction angle θ, and the diffraction angle θ is determined by a distance d between the pixels (or the adjacent pixels) PX in the display panel 50 and a wavelength λ of the light incident into the display panel 50 from the light source 10. For example, the diffraction angle θ may be calculated by an equation $\sin^{-1}(\lambda/(2d))$.

According to the above calculation, as the wavelength λ of the light source 10 increases and the distance d between pixels PX is reduced, the diffraction angle θ may increase. In case that the diffraction angle θ increases, the viewing angle may also increase. Thus, in order to increase the viewing angle, the wavelength λ of the light source 10 has to be reduced or the distance d between the pixels PX has to be reduced.

In order to implement an ideal holographic display apparatus, each pixel PX in the display panel 50 may have a small size and the distance d between the pixels PX may be narrow.

The light emitted from the light source 10 sequentially may pass through the first lens 20, the waveguide 30, and the second lens 40, and the light after passing through the second lens 40 passes through a surface of the display panel 50 adjacent to the second lens 40, and an image may be realized at a side of an opposite surface of the display panel 50.

Figure 3:
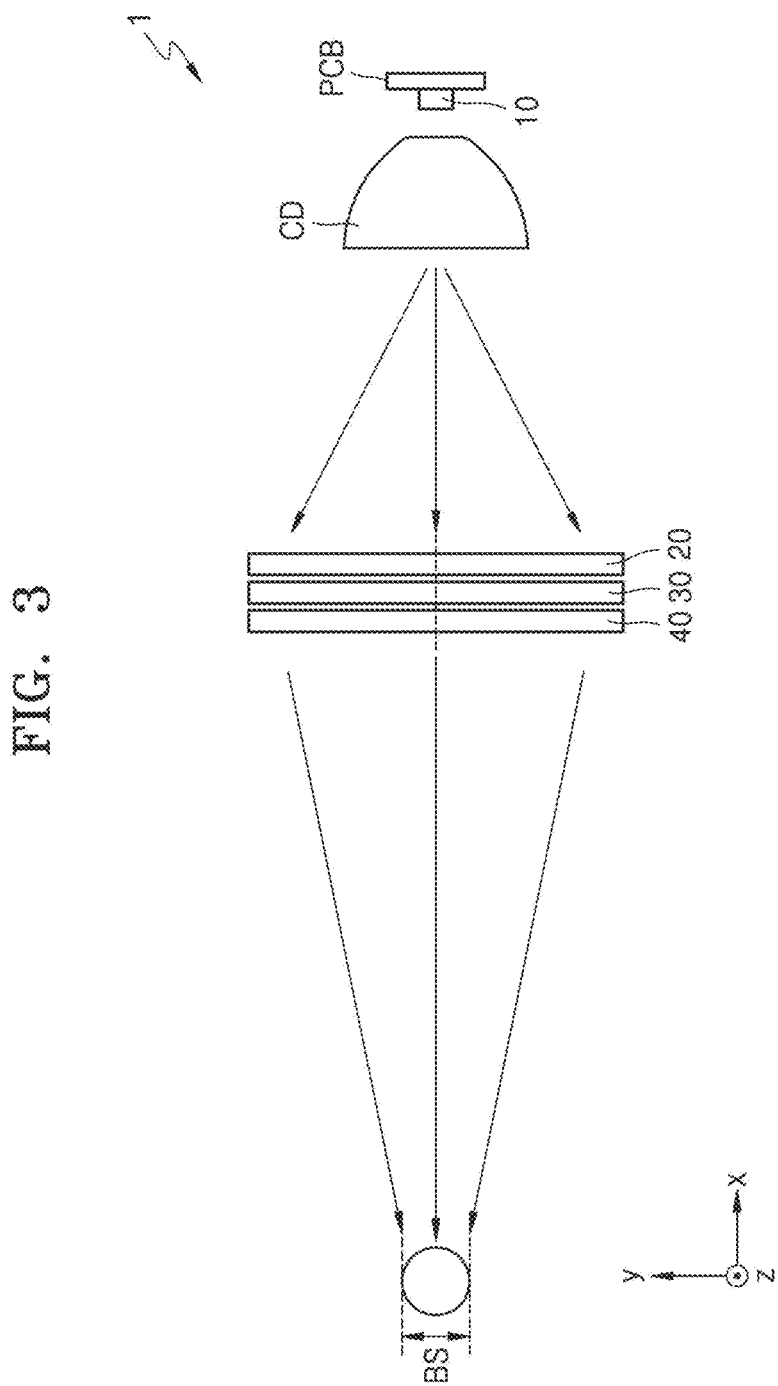
FIG. 3 is a schematic view of a holographic display apparatus according to an embodiment.

FIG. 3 is a schematic view of the holographic display apparatus 1 according to an embodiment. In FIG. 3, like reference numerals as those of FIG. 1 denote the same members, and detailed descriptions thereof are omitted.

Figure 4A:
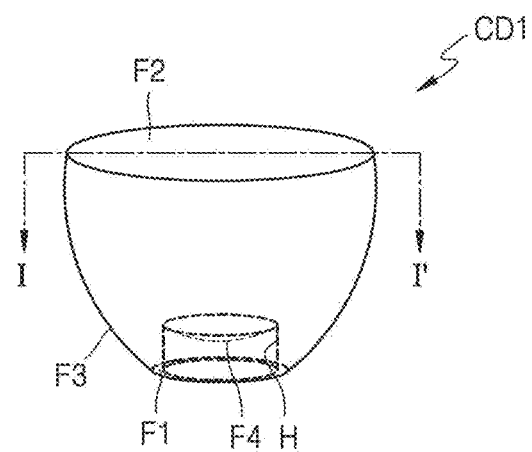
FIG. 4A is a schematic perspective view of a condensing lens according to an embodiment.
Figure 4B:
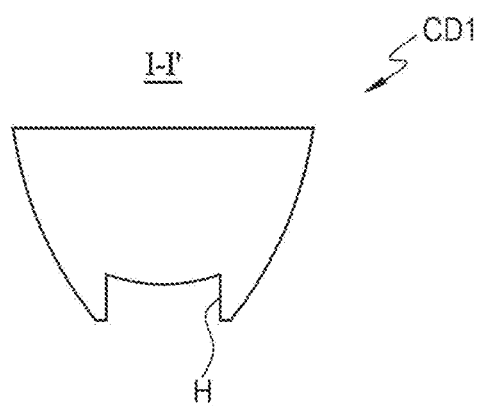
FIG. 4B is a schematic cross-sectional view of the condensing lens taken along line I-I' of FIG. 4A.
Figure 5A:
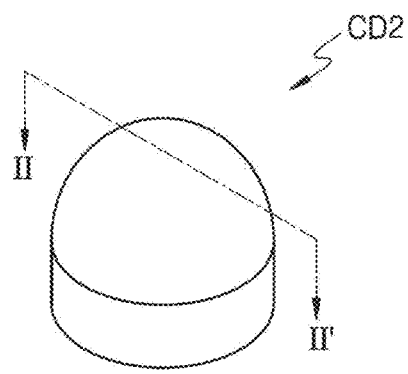
FIG. 5A is a schematic perspective view of a condensing lens according to an embodiment.
Figure 5B:
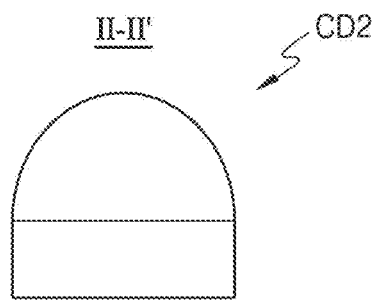
FIG. 5B is a schematic cross-sectional view of the condensing lens taken along line II-II' of FIG. 5A.
Figure 6:
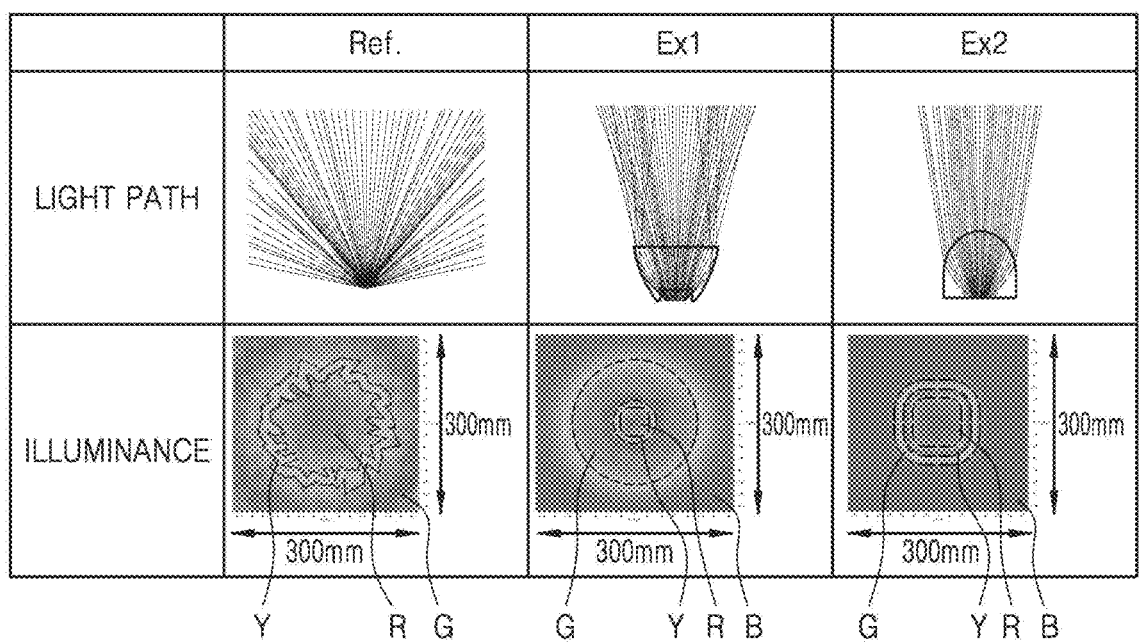
FIG. 6 is a table for comparing condensing lenses according to an embodiment.

FIGS. 4A and 5A are schematic perspective views of a condensing lens according to an embodiment, FIG. 4B is a cross-sectional view of the condensing lens taken along line I-I' of FIG. 4A, and FIG. 5B is a cross-sectional view of the condensing lens taken along line II-II' of FIG. 5A. FIG. 6 is a table for comparing condensing lenses according to an embodiment.

Referring to FIG. 3, the holographic display apparatus 1 according to the embodiment may include a condensing lens CD between the light source 10 and the first lens 20.

The condensing lens CD may collect the light emitted from the light source 10, and may include plastic such as polymethyl methacrylate (PMMA) or polycarbonate (PC), silicon (Si), etc.

In case that the condensing lens CD is between the light source 10 and the first lens 20 as in the embodiment, the light emitted from the light source 10 is refracted or reflected to be collected while passing through the condensing lens CD, and the collected light sequentially passes through the first lens 20, the waveguide 30, and the second lens 40 to form a beam at one point. For example, the beam may have a circular shape, a rectangular shape, etc.

A beam size BS may vary depending on whether the condensing lens CD is provided and a shape of the condensing lens CD, and this will be described in detail later with reference to FIG. 6.

Referring to FIGS. 4A and 4B, in an embodiment, the condensing lens CD1 may include a first surface F1 adjacent to the printed circuit board, and a second surface F2 farther distant than the first surface from the printed circuit board PCB. The first surface may have an area less than an area the second surface.

In an embodiment, the condensing lens CD1 may include a the lower portion having a groove, and the light source 10 may be disposed in the groove H.

The light emitted from the light source 10 is partially reflected by a third surface F3 of the condensing lens CD1, for example, a side surface of the condensing lens CD1, and may be partially refracted through a fourth surface F4 in the condensing lens CD1. The third surface F3 and the fourth surface F4 of the condensing lens CD1 may be curved, and the fourth surface F4 of the condensing lens CD1 may be convex towards the light source 10.

The light emitted from the light source 10 may be collected while passing through the condensing lens CD1, and may sequentially pass through the first lens 20, the waveguide 30, and the second lens 40, and then the beam size BS formed at a point may be reduced.

Referring to FIGS. 5A and 5B, in an embodiment, the condensing lens CD2 may have a shape different from the condensing lens CD1 of FIGS. 4A and 4B. For example, the condensing lens CD2 may have a dome shape. The light source 10 is at a lower surface of the condensing lens CD2, and an upper surface of the condensing lens CD2 may be curved.

The light emitted from the light source 10 is refracted at the upper surface of the condensing lens CD2 in a direction in which the light is collected and proceeds outwards, and then, the beam size BS of the beam formed by the light after sequentially passing through the first lens 20, the waveguide 30, and the second lens 40 may be reduced.

FIG. 6 compares light paths and illuminances respectively when the condensing lens CD is not used (Ref.), when the condensing lens CD1 of FIGS. 4A and 4B is used (Ex1), and when the condensing lens CD2 of a dome shape is used (Ex2).

The light paths will be compared with reference to FIG. 6. When the condensing lens CD is not used (Ref.), the light emitted from the light source 10 spreads in all directions. However, when the condensing lens CD1 is used (Ex1) or when the condensing lens CD2 is used (Ex2), the light emitted from the light source 10 is collected towards one direction while passing through the condensing lens CD1 or the condensing lens CD2 without spreading in all directions.

Also, according to the illuminances of the beams formed at one point respectively when the condensing lens CD is not used (Ref.), when the condensing lens CD1 of FIGS. 4A and 4B is used (Ex1), and when the condensing lens CD2 of the dome shape is used (Ex2), the beam sizes BS and intensities of ambient light that blurs the diffraction pattern when realizing images may be recognized.

The illuminance is represented in red, yellow, green, and blue colors, that is, red denotes the brightest light, and then the brightness is reduced in an order of red, yellow, green, and blue. Here, the red portion that is the brightest may be defined as the beam size BS.

When the condensing lens CD is not used (Ref.), a boundary between the brightest red portion and the yellow portion is not clear, and the beam size BS, that is, the red portion, is also spread and increases.

When the condensing lens CD1 of FIGS. 4A and 4B is used (Ex1), the light emitted from the light source 10 passes through the condensing lens CD1, and then, the light path is concentrated in one direction and the boundary between the red portion, that is, the brightest portion, and the yellow portion is clear. Also, the beam size BS, that is, the area of the red portion that is the brightest, is reduced about 10 times smaller than that of the case in which the condensing lens CD is not used (Ref.), and a luminance at a central portion of the light emitted from the light source 10 is increased about 10 times greater than that of the case (Ref.).

When the condensing lens CD2 of FIGS. 5A and 5B is used (Ex2), the light emitted from the light source 10 passes through the condensing lens CD2, and the light path is concentrated in one direction like in the case in which the light passes through the condensing lens CD1 (Ex1). The boundary between the red portion, that is, the brightest portion, and the yellow portion is clear, and the beam size BS, that is, the size of the red portion, is noticeably reduced as compared with the case in which the condensing lens CD is not used (Ref.). Also, the luminance at the central portion of the light emitted from the light source 10 is increased about 10 times or greater as compared with the case in which the condensing lens CD is not used (Ref.).

In an embodiment, the holographic display apparatus 1 may include the condensing lens CD between the light source 10 and the first lens 20. The light emitted from the light source 10 passes through the condensing lens CD and is collected so that the light path may be in one direction. Because the light proceeds while concentrating in one direction, the luminance may be increased. The beam size BS of the beam that is formed at one point by the light that has passed sequentially through the first lens 20, the waveguide 30, and the second lens 40 may be reduced.

Figure 7:
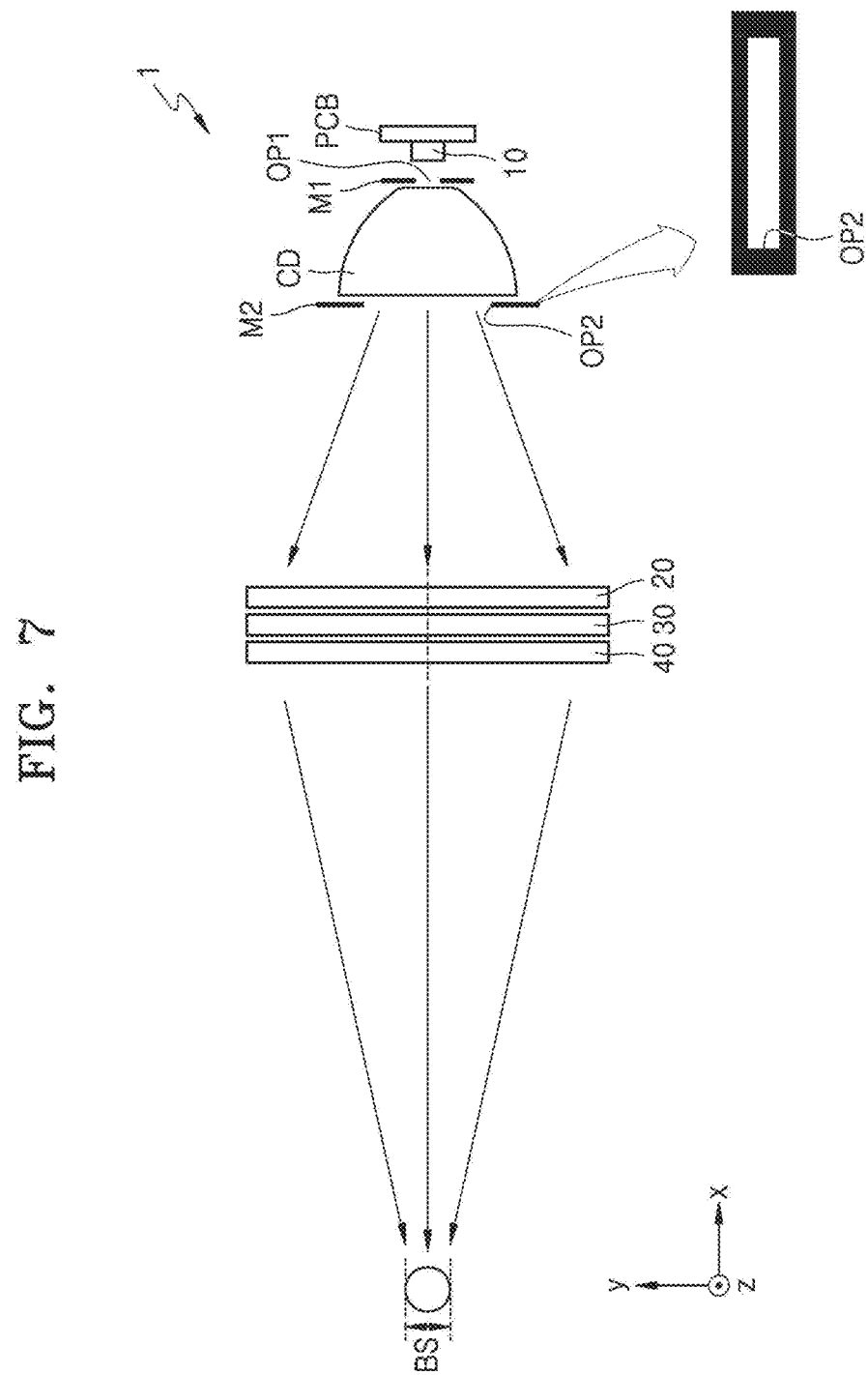
FIG. 7 is a schematic view of a holographic display apparatus according to an embodiment.
Figure 8:
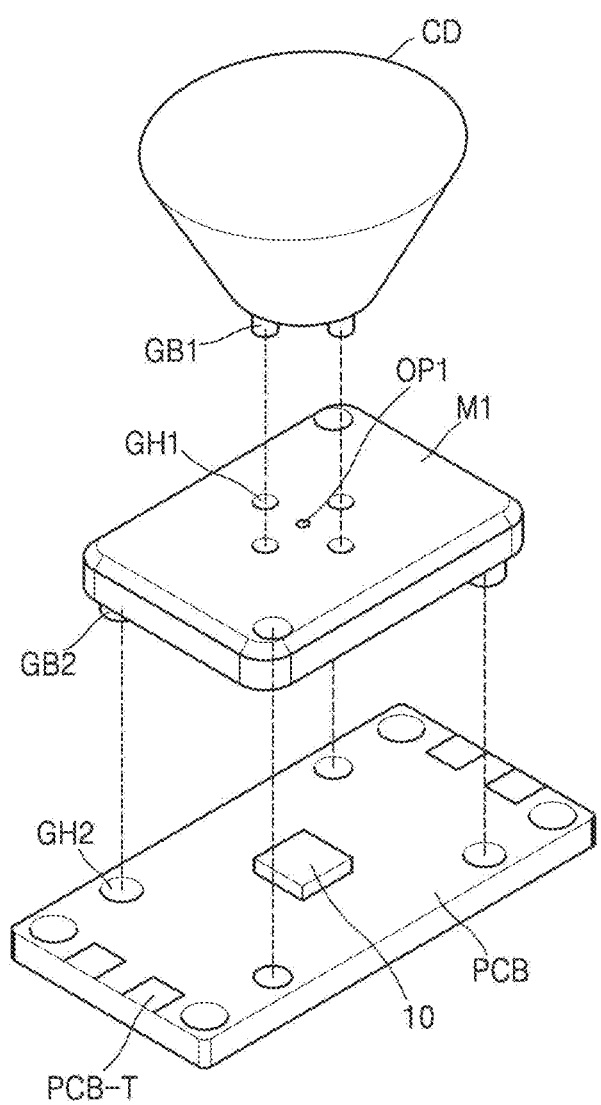
FIG. 8 is a schematic perspective view partially showing a holographic display apparatus according to an embodiment.

FIG. 7 is a schematic view of the holographic display apparatus 1 according to an embodiment. FIG. 8 is a schematic perspective view partially showing the holographic display apparatus 1 according to the embodiment, and FIGS. 9A, 9C, 9D, and 9E are respectively a perspective view, a plan view, a side view, and a front view of the holographic display apparatus of FIG. 8. Also, FIG. 9B is a schematic cross-sectional view of the holographic display apparatus taken along line III-III' of FIG. 9A.

Referring to FIG. 7, the holographic display apparatus 1 according to the embodiment may include the condensing lens CD between the light source 10 and the first lens 20, and may further include a first mask M1 between the condensing lens CD and the light source 10 and a second mask M2 between the first lens 20 and the condensing lens CD.

In an embodiment, the holographic display apparatus 1 may not include the condensing lens CD, and may include at least one of the first mask M1 and the second mask M2 between the first lens 20 and the light source 10.

The first mask M1 may include a first opening OP1, and the second mask M2 may include a second opening OP2. The first mask M1 may include aluminum (Al), and the second mask M2 may include aluminum (Al) or a plastic material.

In case that the first mask M1 adjacent to the light source 10 includes aluminum (Al) having an excellent thermal conductivity, the heat generated by the light source 10 may be readily transferred and dissipated to outside.

In an embodiment, a surface of the first mask M1 and a surface of the second mask M2 may be black. In order to make the surface of the first mask M1 and the surface of the second mask M2 black, the surfaces may be coated with $CrO_x$, $CrO_x/CrN_y$, resin (Carbon pigment, RGB-mixed pigment), graphite, non-Cr based pigment, etc.

In this case, the light emitted from the light source 10 may partially proceed to the surfaces of the first mask M1 and the second mask M2, and may not be reflected but absorbed by the surfaces of the first mask M1 and the second mask M2. As such, proceeding of the light having different phases due to the reflection may be prevented.

In FIG. 7, the first opening OP1 and the second opening OP2 are illustrated together in order to show that the ambient light of the light emitted from the light source 10, which proceeds outwards with respect to the first mask M1 and the second mask M2, may be blocked. However, the embodiments and configuration of the first opening OP1 and the second opening OP2 are not limited to. For example, the second opening OP2 may be formed as a slit so that the light may be only partially transmitted therethrough (referring to the enlarged view of the second mask M2). Also, the first opening OP1 of the first mask M1 may be formed as a slit so as to partially transmit the light, and an example thereof is shown in FIG. 8.

The second mask M2 and the second opening OP2 of the second mask M2 are illustrated as rectangular shapes in the drawings, but may have circular shapes or other shapes.

In an embodiment, the second mask M2 may be disposed between the condensing lens CD and the first lens 20, and a size of the second mask M2 may vary depending on a location thereof. In particular, the second opening OP2 of the second mask M2 may be differently designed according to the location of the second mask M2. For example, as the second mask M2 is closer to the first lens 20, a size of the second opening OP2 of the second mask M2 may be greater.

FIG. 8 is an exploded perspective view for explaining how the condensing lens CD, the first mask M1, the light source 10, and the printed circuit board PCB are assembled, according to an embodiment. The condensing lens CD may be the condensing lens CD1 of FIGS. 4A and 4B or the condensing lens CD2 of FIGS. 5A and 5B, or may be or include a lens having another shape for collecting the light.

In an embodiment, a first guide protrusion GB1 may be disposed on a lower portion of the condensing lens CD, and a first guide recess GH1 may be disposed in a surface of the first mask M1. In case that the first guide protrusion GB1 of the condensing lens CD is inserted into the first guide recess GH1 of the first mask M1, the condensing lens CD and the first mask M1 may be aligned. In FIG. 8, four first guide protrusions GB1 and four first guide recesses GH1 are provided, but the number of the first guide protrusions GB1 and the number of the first guide recesses GH1 may be respectively greater or less than 4.

Also, a second guide protrusion GB2 may be disposed on the lower portion of the first mask, and a second guide recess GH2 may be disposed v of the printed circuit board PCB. In case that the second guide protrusion GB2 of the first mask M1 is inserted into the second guide recess GH2 of the printed circuit board PCB, the first mask M1 and the printed circuit board PCB may be aligned with each other, and may be fixed by a screw that penetrates through both the first mask M1 and the printed circuit board PCB. In FIG. 8, two second guide protrusions GB2 and two second guide recesses GH2 are provided, but the number of the second guide protrusions GB2 and the number of the second guide recesses GH2 may be respectively greater or less than 2.

The light source 10 is provided on the printed circuit board PCB, and may be electrically connected to a power supply unit (not shown) via terminals PCB-T at opposite corners of the printed circuit board PCB to emit the light.

In an embodiment, the first mask M1 may include the first opening OP1 and the light emitted from the light source 10 may proceed towards the condensing lens CD through the first opening OP1 of the first mask M1. As an example, the first opening OP1 of the first mask M1 may have a circular shape.

Figure 9A:
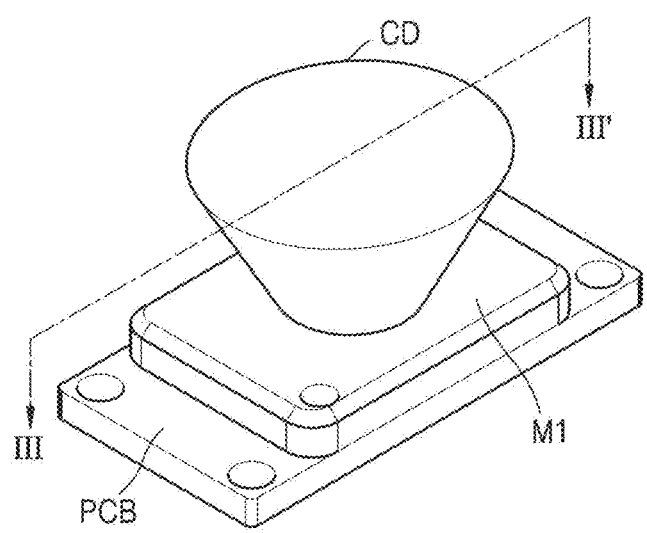
FIG. 9A is a schematic perspective view partially showing a holographic display apparatus according to an embodiment.
Figure 9B:
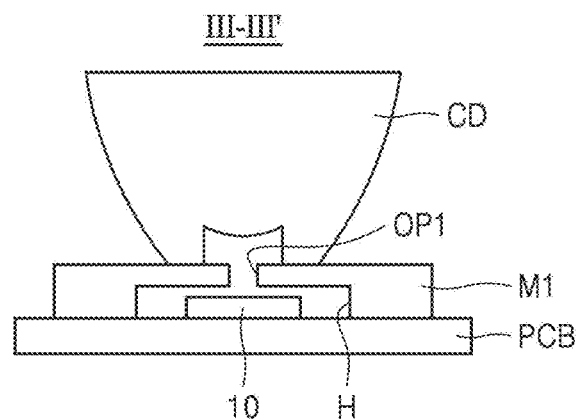
FIG. 9B is a schematic cross-sectional view of the holographic display apparatus taken along line III-III' of FIG. 9A.

FIG. 9A shows a state in which the condensing lens CD, the first mask M1, the light source 10, and the printed circuit board PCB, which are parts of the holographic display apparatus 1 according to the embodiment, are coupled to one another, and FIG. 9B is a schematic cross-sectional view of the holographic display apparatus taken alone line III-III' of FIG. 9A.

Referring to FIG. 9B, the light source 10 may be disposed in the groove H that is formed in a lower portion of the first mask M1. The light source 10 provided on the printed circuit board PCB may be disposed in the groove H of the first mask M1 when the printed circuit board PCB and the first mask M1 are coupled to each other.

Figure 9C:
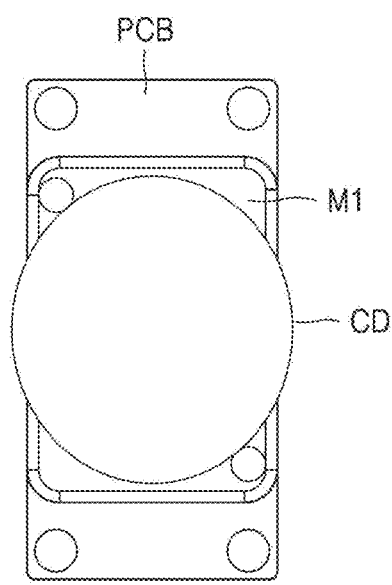
FIG. 9C is a schematic plan view partially showing a holographic display apparatus according to an embodiment.
Figure 9D:
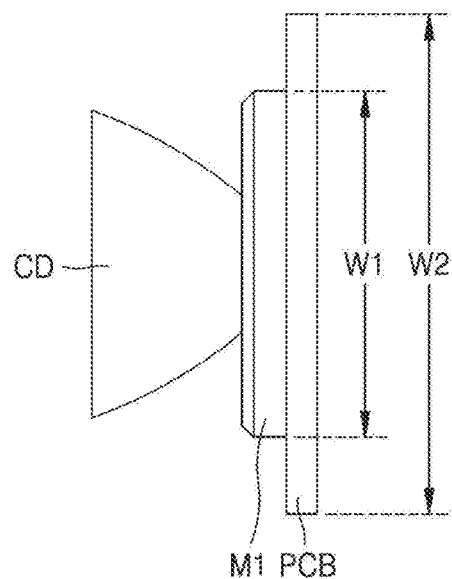
FIG. 9D is a schematic side view partially showing a holographic display apparatus according to an embodiment.
Figure 9E:
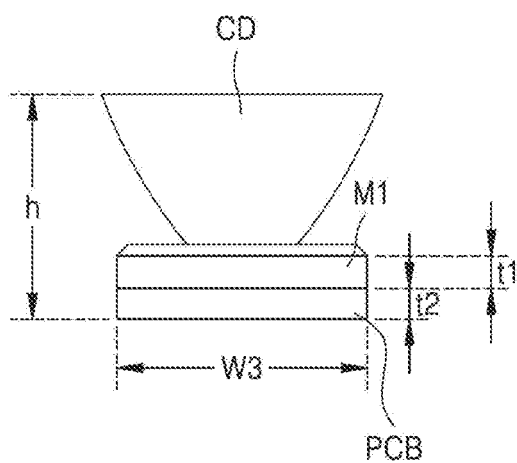
FIG. 9E is a schematic front view partially showing a holographic display apparatus according to an embodiment.

FIG. 9C is a schematic plan view partially showing the holographic display apparatus 1 of FIG. 9A according to the embodiment, and FIGS. 9D and 9E are respectively a schematic side view and a schematic front view of the holographic display apparatus 1.

Referring to FIG. 9D, a width W1 of the first mask M1 may be less than a width W2 of the printed circuit board PCB. For example, the width W1 of the first mask M1 may be in a range of about 9 mm to about 27 mm, and the width W2 of the printed circuit board PCB may be in a range of about 13 mm to about 40 mm.

In FIG. 9D, the width W1 of the first mask M1 is less than the width W2 of the printed circuit board PCB. However, in case that the terminals PCB-T at the opposite corners of the printed circuit board PCB are arranged on other locations, the width W1 of the first mask M1 may be equal to the width W2 of the printed circuit board PCB.

Referring to FIG. 9E, the first mask M1 and the printed circuit board PCB may have a same width, e.g., W3. For example, the width W3 of the first mask M1 and the printed circuit board PCB may be in a range of about 6 mm to about 20 mm.

Also, a thickness t1 of the first mask M1 may be greater than a thickness t2 of the printed circuit board PCB. For example, the thickness t1 of the first mask M1 may be in a range of about 1 mm to about 4 mm, and the thickness t2 of the printed circuit board PCB may be in a range of about 0.5 mm to about 2.5 mm. A total height h of the condensing lens CD, the first mask M1, the light source 10, and the printed circuit board PCB of the holographic display apparatus 1 according to the embodiment may be in a range of about 5 mm to about 18 mm.

Figure 10A:
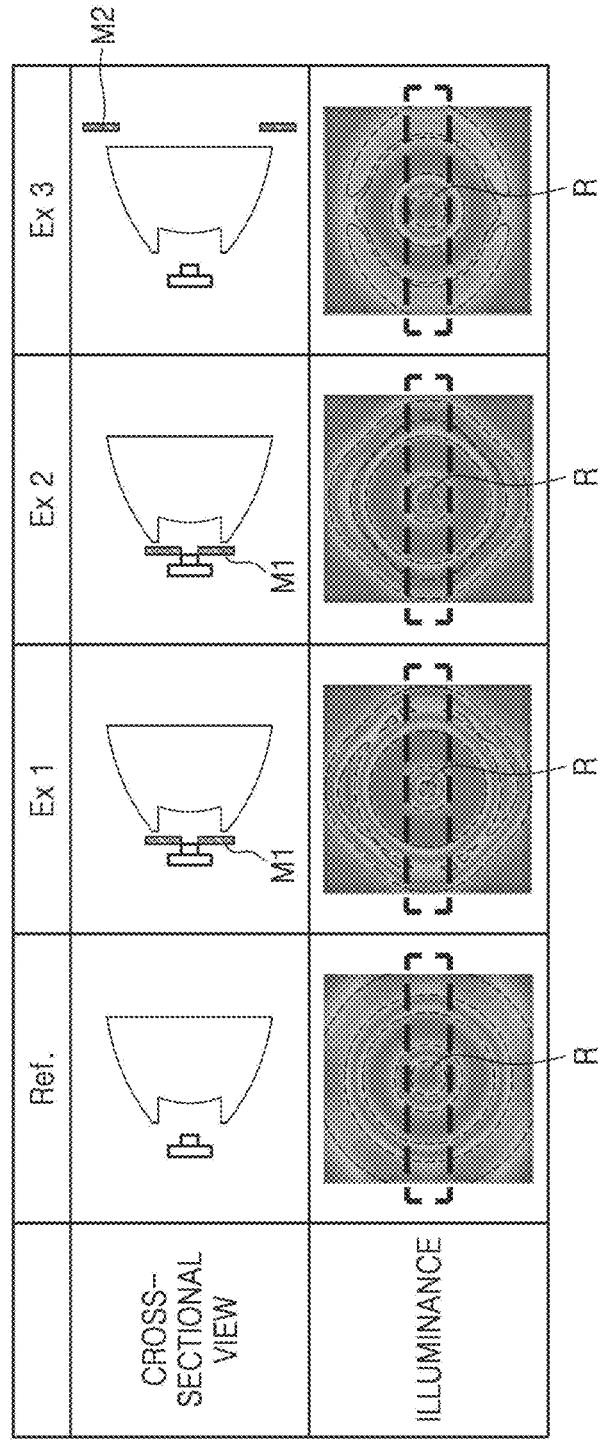
FIGS. 10A and 10B are tables for describing a variation in illuminance in a holographic display apparatus according to an embodiment.
Figures 10B, 10C:
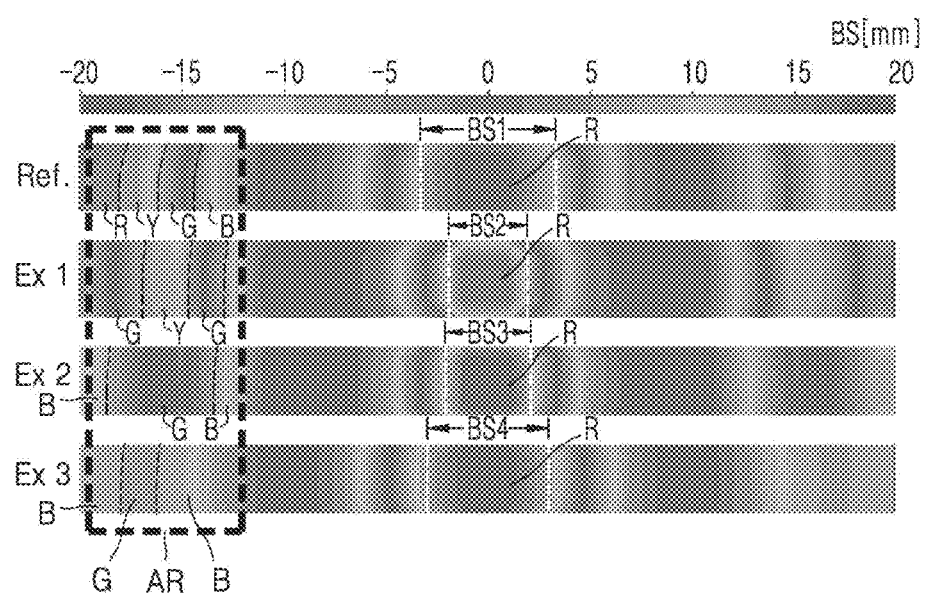
FIG. 10C is a table showing comparison between images and diffraction patterns through a holographic display apparatus according to an embodiment.

FIGS. 10A and 10B are tables for describing a variation in illuminance in a holographic display apparatus according to an embodiment.

In detail, FIG. 10A shows a comparison of beams that are formed at one point by the light emitted from the light source 10 sequentially passing through the first lens 20, the waveguide 30, and the second lens 40 respectively when the condensing lens CD is used (Ref.), when the first mask M1 including the first opening OP1 is used between the light source 10 and the condensing lens CD (Ex1 and Ex2), and when the second mask M2 including the second opening OP2 is used between the condensing lens CD and the first lens 20 (Ex3). FIG. 10B shows beam sizes BS and ambient light after enlarging a central portion of the beam in each case of FIG. 10A.

In case that the first mask M1 including the first opening OP1 is used between the light source 10 and the condensing lens CD (Ex1 and Ex2), in the example Ex1, the first opening OP1 of the first mask M1 has a rectangular shape and has a horizontal length and a vertical length of about 1 mm. In another example (Ex2), the first opening OP1 of the first mask M1 has a rectangular shape and has a horizontal length and a vertical length of about 1.3 mm.

Also, in case that the second mask M2 including the second opening OP2 is used between the condensing lens CD and the first lens 20 (Ex2), the second opening OP2 of the second mask M2 has a circular shape having a diameter of about 8 mm.

Referring to FIGS. 10A and 10B, when only the condensing lens CD is used (Ref.), a beam size BS1 is the largest, and when the first mask M1 including the first opening OP1 having the horizontal and vertical lengths of about 1 mm is used between the light source 10 and the condensing lens CD (Ex1), a beam size BS2 is the smallest.

Beam sizes BS3 and BS4 obtained respectively when the first mask M1 including the first opening OP1 having the horizontal and vertical lengths of about 1.3 mm is used between the light source 10 and the condensing lens CD (Ex2) and when the second mask M2 including the second opening OP2 is used between the condensing lens CD and the first lens 20 (Ex3) are greater than the beam size BS2 obtained when the first mask M1 including the first opening OP1 having the horizontal and vertical lengths of about 1 mm is used between the light source 10 and the condensing lens CD (Ex1) and less than the beam size BS1 obtained when only the condensing lens CD is used (Ref.). In case that the first mask M1 is provided between the condensing lens CD and the light source 10, the beam size BS corresponding to the red portion that is the brightest may be reduced.

Also, in a peripheral area AR formed on outer portions of the beams shown in FIG. 10B, red, yellow, and green colors are diminished in an order of the case (Ref.) in which only the condensing lens CD is used, the cases (Ex1 and Ex2) in which the first mask M1 including the first opening OP1 is used between the light source 10 and the condensing lens CD, and the case (Ex3) in which the second mask M2 including the second opening OP2 is used between the condensing lens CD and the first lens 20. As such, it may be identified that ambient light (stray light) that may blur the pattern such as an image realized by the holographic display apparatus 1 may be reduced when the second mask M2 is provided between the condensing lens CD and the first lens 20.

The holographic display apparatus 1 according to the embodiment may include the first mask M1, the condensing lens CD, and the second mask M2. As illustrated above with reference to FIGS. 6, 10A, and 10B, the luminance of the light emitted from the light source 10 may be increased by using the condensing lens CD, the beam size BS of the beam formed on one surface may be reduced by using the first mask M1, and the ambient light that interferes the realization of the image may be removed by using the second mask M2.

FIG. 10C is a table showing comparison between images and diffraction patterns through a holographic display apparatus according to an embodiment.

In detail, FIG. 10C shows images and diffraction patterns that are formed at one point by the light emitted from the light source 10 and sequentially passing through the first lens 20, the waveguide 30, and the second lens 40 respectively in case that the condensing lens CD is only provided between the light source 10 and the first lens 20 (Ref.) and in case that the first mask M1, the condensing lens CD, and the second mask M2 are sequentially provided or disposed between the light source 10 and the first lens 20 (Ex1). An image at the left denotes an image formed when the display panel 50 is not provided, and an image at the right denotes a diffraction pattern shown when the display panel 50 is provided.

In case that the condensing lens CD is only disposed between the light source 10 and the first lens 20 (Ref.), relatively more ambient light around the circular beam exists in the image formed when the display panel 50 is not provided in the display apparatus.

In contrast, in case that the first mask M1, the condensing lens CD, and the second mask M2 are sequentially arranged between the light source 10 and the first lens 20 (Ex1), the image formed when the display panel 50 is not provided may have a luminance greater than that when the condensing lens CD is only disposed between the light source 10 and the first lens 20 (Ref.), and light glaring due to the ambient light may be improved.

Comparing the diffraction patterns obtained, respectively, when the condensing lens CD is only used (Ref.) and when the first mask M1, the condensing lens CD, and the second mask M2 are sequentially arranged (Ex1) with the display panel 50, the diffraction pattern is blurred due to the ambient light when the condensing lens CD is only disposed (Ref.). In contrast, when the first mask M1, the condensing lens CD, and the second mask M2 are sequentially disposed (Ex1), there is no or little ambient light and the diffraction pattern may be clearly implemented or presented.

The holographic display apparatus 1 according to the embodiments may include, between the light source 10 and the first lens 20, at least one of the first mask M1, the condensing lens CD, and the second mask M2. The luminance of light emitted from the light source 10 may be improved by the condensing lens CD. The beam size BS of the beam formed on a surface may be reduced by the first mask M1. The ambient light that interferes the realization of the images may be removed by the second mask M2. In case that the light emitted from the light source 10 penetrates through the display panel 50 after passing through the above structure, the clear diffraction pattern may be implemented or presented.

The descriptions are mainly directed to the holographic display apparatus, but the disclosure is not limited thereto. For example, a method of manufacturing the holographic display apparatus may be also included in the scope of the disclosure.

According to the above embodiments, the holographic display apparatus having improved clarity of the diffraction pattern may be implemented. However, the scope of the disclosure is not limited to the above embodiments.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A holographic display apparatus comprising:
a light source disposed on a printed circuit board;
a display panel diffracting light transferred from the light source;
an optical system that includes a collimation lens disposed between the light source and the display panel;
a condensing lens disposed between the light source and the optical system, and collecting the light transferred from the light source; and
a first mask disposed between the light source and the condensing lens, wherein
the optical system converts the light incident from the light source into a surface light source,
the condensing lens includes a lower portion having a guide protrusion,
the first mask includes a surface having a guide recess, and
the condensing lens and the first mask are aligned by inserting the guide protrusion into the guide recess.

2. The holographic display apparatus of claim 1, further comprising a second mask disposed between the condensing lens and the optical system, wherein
the second mask includes at least one surface of black color.

3. The holographic display apparatus of claim 2, wherein
the second mask includes an opening, and
a size of the opening varies in accordance with a location of the second mask.

4. The holographic display apparatus of claim 1, wherein the printed circuit board includes at least one surface of black color.

5. The holographic display apparatus of claim 1, wherein the condensing lens includes:
a first surface adjacent to the printed circuit board; and
a second surface farther distant than the first surface from the printed circuit board,
wherein the first surface has an area less than an area of the second surface.

6. The holographic display apparatus of claim 1, wherein the condensing lens includes a lower portion having a groove, and
the light source is disposed in the groove.

7. The holographic display apparatus of claim 1, wherein the first mask includes a lower portion having a groove, and
the light source is disposed in the groove.

8. The holographic display apparatus of claim 1, wherein the first mask includes an opening through which the light from the light source passes.

9. The holographic display apparatus of claim 1, wherein the condensing lens has a dome shape.

10. The holographic display apparatus of claim 1, wherein
the light source produces spatially coherent light, and
the optical system converts the spatially coherent light into the surface light source.

11. A holographic display apparatus comprising:
a printed circuit board;
a light source disposed on the printed circuit board;
a first lens transmitting light emitted from the light source in a direction substantially parallel with a direction from the light source to the first lens, the first lens including a collimation lens;
a first mask disposed between the light source and the first lens, the first mask including at least one surface of black color;
a waveguide converting light transferred from the first lens into a surface light source such that a majority of light exiting the waveguide is directed in a substantially same direction;
a second lens collecting light transferred from the waveguide; and
a display panel diffracting light passing through the second lens, wherein
the light passing through the second lens transmits through a surface of the display panel, and
an image is displayed on another surface of the display panel, the surface and the another surface of the display panel being opposite each other.

12. The holographic display apparatus of claim 11, further comprising a condensing lens disposed between the first mask and the light source.

13. The holographic display apparatus of claim 12, wherein
the condensing lens includes a lower portion having a groove,
the light source is disposed in the groove, and
the light emitted from the light source is refracted through the groove.

14. The holographic display apparatus of claim 11, further comprising a condensing lens disposed between the first lens and the first mask.

15. The holographic display apparatus of claim 14, further comprising a second mask disposed between the condensing lens and the light source, the second mask including at least one surface of black color.

16. The holographic display apparatus of claim 11, wherein the light source includes a light-emitting diode.

17. The holographic display apparatus of claim 11, wherein the display panel includes a liquid crystal display panel.

18. The holographic display apparatus of claim 11, wherein
the first mask has an opening that is completely above the light source.

19. The holographic display apparatus of claim 11, wherein the first mask makes direct contact with the printed circuit board.

20. A holographic display apparatus comprising:
a printed circuit board;
a light source disposed on the printed circuit board;
a first lens transmitting light emitted from the light source in a direction substantially parallel with a direction from the light source to the first lens, the first lens including a collimation lens;
a first mask disposed between the light source and the first lens, the first mask including at least one surface of black color;
a waveguide converting light transferred from the first lens into a surface light source;
a second lens collecting light transferred from the waveguide; and a display panel diffracting light passing through the second lens, wherein the light passing through the second lens transmits through a surface of the display panel, an image is displayed on another surface of the display panel, the surface and the another surface of the display panel being opposite each other, and the first lens, the waveguide, and the second lens are configured such that a beam size formed at one point by light that has passed sequentially through the first lens, the waveguide, and the second lens is reduced.

* * * * *